Nov. 24, 1964           R. P. SMITH           3,158,395

VEHICLE DOOR AND WINDSHIELD STRUCTURE

Filed March 16, 1962           3 Sheets-Sheet 1

RAYMOND P. SMITH
INVENTOR.

BY John R. Faulkner
John J. Roethel
ATTORNEYS

Nov. 24, 1964   R. P. SMITH   3,158,395
VEHICLE DOOR AND WINDSHIELD STRUCTURE
Filed March 16, 1962   3 Sheets-Sheet 2

RAYMOND P. SMITH
INVENTOR.

BY John R. Faulkner
John J. Roethel
ATTORNEYS

Nov. 24, 1964    R. P. SMITH    3,158,395
VEHICLE DOOR AND WINDSHIELD STRUCTURE
Filed March 16, 1962    3 Sheets-Sheet 3

RAYMOND P. SMITH
INVENTOR.

BY John R. Faulkner
John J. Roethel
ATTORNEYS

United States Patent Office 3,158,395
Patented Nov. 24, 1964

3,158,395
VEHICLE DOOR AND WINDSHIELD
STRUCTURE
Raymond P. Smith, Huntington Woods, Mich., assignor to Ford Motor Company, Dearborn, Mich., a corporation of Delaware
Filed Mar. 16, 1962, Ser. No. 180,217
6 Claims. (Cl. 296—44)

This invention relates to motor vehicle body structures and more particularly to closure structures for vehicle bodies having a low roof line and large glass areas.

The current trend in automotive vehicle design is toward lower bodies, larger glass areas and smaller roof panels. This trend poses a problem in the provision of body openings permitting convenient egress from and ingress to the passenger compartment. Closure structures for such body openings must be constructed and arranged to permit ready access to the seats without requiring undue contortions on the part of the passengers or driver upon entering or leaving the vehicle. To a certain extent, compensation for reduction in vertical height can be made by increasing the width of the closure structure or vehicle door. This, however, causes inconvenience in obtaining access to the passenger compartment when the vehicle is parked in a crowded parking lot or in such other areas as narrow garages where the clearance between the sides of the vehicle and adjacent obstructions are relatively limited, thus restricting the swinging movement of the closure.

Further compensation for the reduced vertical clearance may be achieved by constructing the closure structure so that it extends into the roof panel in a closed position. This presents problems in closure structure hinging. Provision must be made for lateral outward movement of the closure.

It is the object of the present invention to provide an opening for the vehicle body which permits convenience in the entry to and egress from the passenger compartment. A further object is to provide a closure structure for a body opening which is mounted in such a way to permit the initial movement of the closure structure to be laterally outwardly and forwardly in a plane substantially coincident with the plane of the body opening before the closure structure is angularly displaced for the remainder of its opening movement.

The closure for the vehicle body embodying this invention comprises a lower door structure and a panel which includes a windshield forming portion of the vehicle body that extends upwardly from the lower door structure. A control means is disposed intermediate the lower door structure and the vehicle body to control the movement of the closure from its closed position to a partially opened position, at which time the closure is substantially parallel with the opening in the vehicle body. Then the closure is angularly displaced from its initially opened position until it is swung to a fully opened position. A means is further interposed between the windshield forming portion and the vehicle body to serve as a guide for the closure during its movement from its fully closed position to its fully opened position.

Thus it can be seen that upon movement of the closure to an opened position, a portion of the windshield is translated from its original position to provide a large unobstructed access opening to the vehicle body. Also, the control and guide means of this invention provide for the laterally outward and forward movement of the closure before the latter is angularly displaced with respect to the body opening to reach its maximum opened position. This will permit a substantial reduction in the clearance currently required for the swinging movement of automobile doors to their fully opened position.

Other objects and advantages of this invention will be made more apparent as this description proceeds particularly when considered in connection with the accompanying drawings, wherein.

Figure 1:
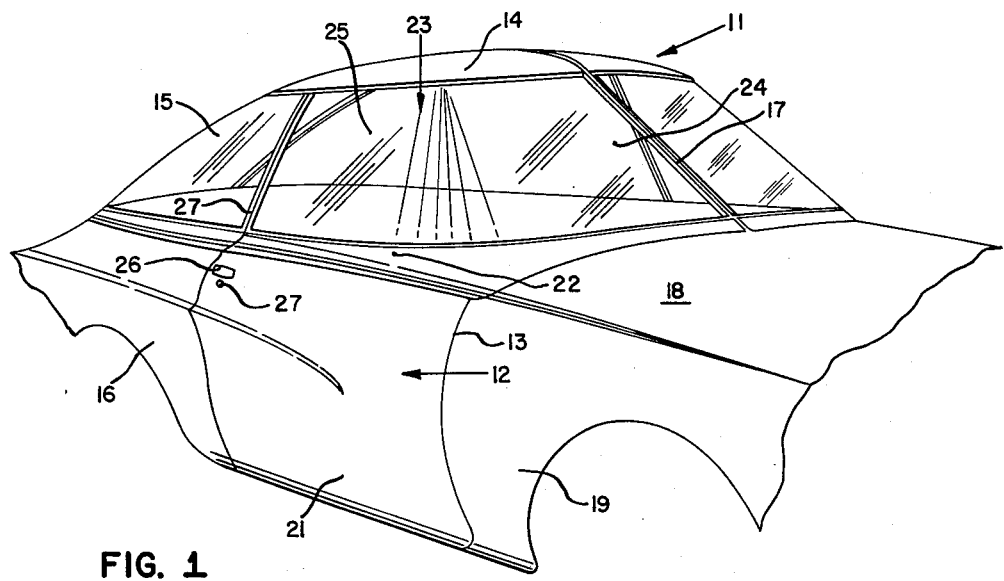
FIGURE 1 is a perspective view of a portion of an automotive vehicle body embodying the present invention with the closure structure in a fully closed position.
Figure 6:
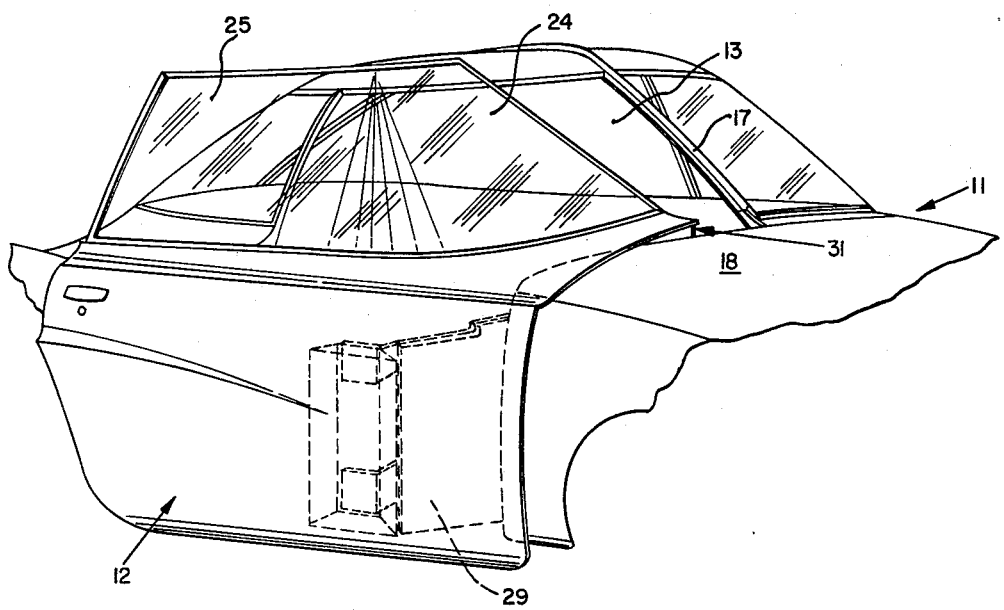
FIGURE 6 is a perspective view of a portion of the vehicle body with the closure structure in a partially opened position.

Referring now to the drawings, particularly to FIGURE 1, there is shown a motor vehicle body 11 having a closure structure 12 adapted to close a body access opening 13 defined at the top by a roof panel 14, at its rear by a curved backlite 15 and a rear quarter panel 16, and at the front by a front fender 19 and a windshield center post 17 extending upwardly from a cowl structure 18.

The closure structure 12 embodying this invention comprises a lower door structure 21 having a generally extending sheet metal extension 22 at the belt line of the vehicle extending laterally and inwardly to form an extension of the outer cowl structure of the vehicle. A glass panel 23 extends upwardly from this extension to provide a portion of the wrap-around windshield 24 and side window 25. The top portion of the glass panel 23 also curves inwardly to reduce the width of the roof panel 14. The lower door structure 21, which is similar to doors currently used in hard top and convertible automotive vehicles, is provided with a conventional door handle 26 and door lock mechanism 27.

Figure 2:
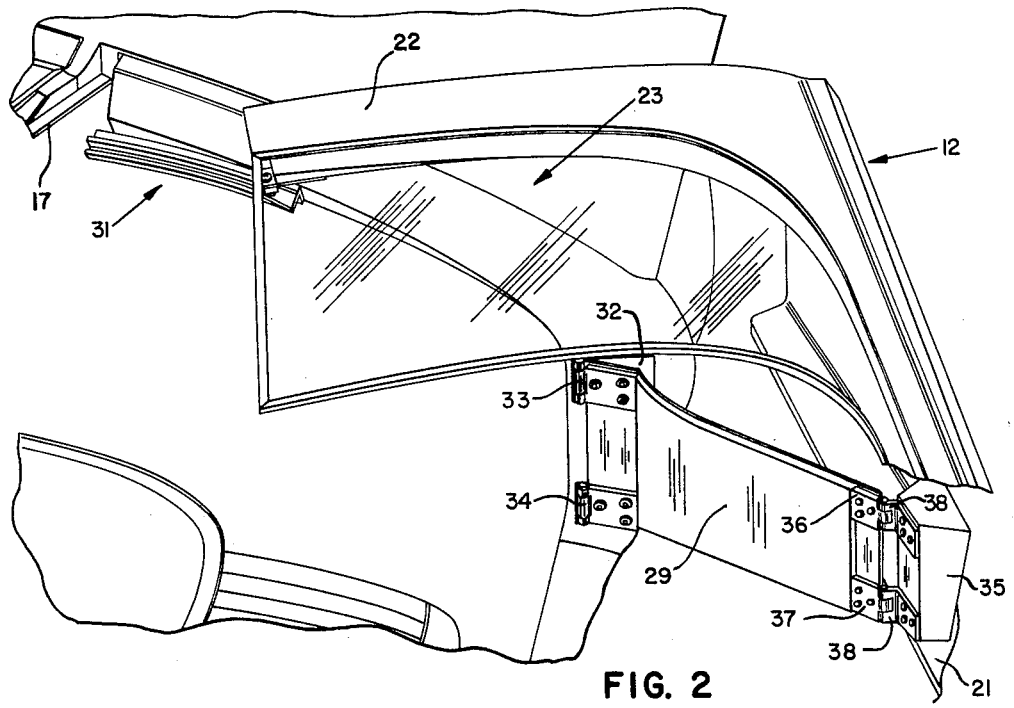
FIGURE 2 is a partial perspective view looking down onto the vehicle with the closure structure in its maximum opened position.
Figure 3:
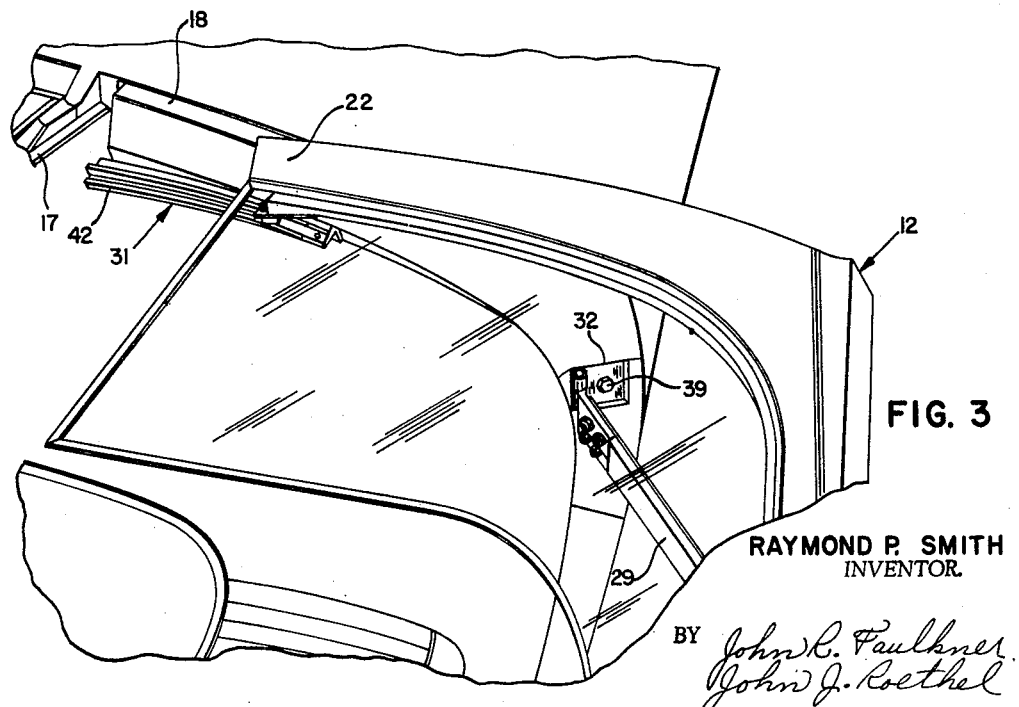
FIGURE 3 is a plan view of a portion of the vehicle with the closure structure in a partially opened position.
Figure 4:
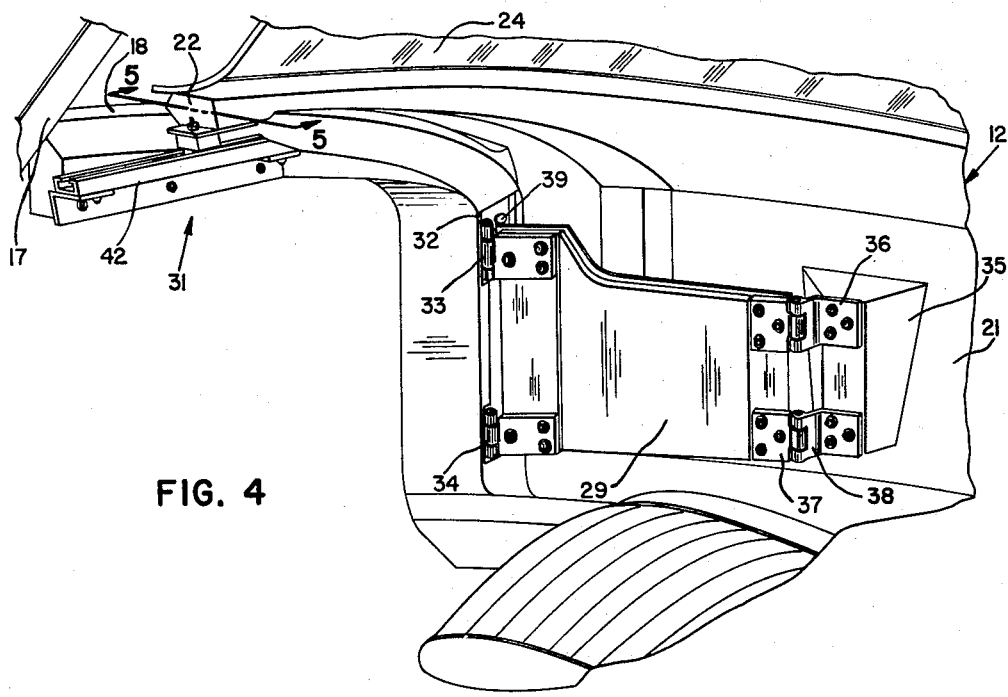
FIGURE 4 is a side elevational view in a forward direction of a portion of the closure structure when the latter is in a partially opened position.

The closure structure 12 is controlled during its opening and closing movement by a control means or hinge assembly 29 and guide means, generally designated as 31, as seen in FIGURES 2 through 4. The control means or hinge assembly 29 is disposed between a generally vertically extending front pillar 32 attached to the vehicle body 11 and the lower door structure 21 intermediate its lateral edges as best seen in FIGURE 2. The control means 29 has one end pivotally connected to the front pillar 32 by an upper inner hinge 33 and a lower inner hinge 34, both inner hinges 33 and 34 having a common pivotal axis extending generally vertically. The other end of the control member 29 is pivotally connected to a support 35 attached to the interior surface of the lower door structure 21 by an upper outer hinge 36 and a lower outer hinge 37. Both outer hinges 36 and 37 also have a common pivotal axis which extends in a generally vertical direction.

In the illustrated embodiment, the upper and lower outer hinges 36 and 37 have their leaves 38 slightly offset to permit the vertical hinge axis extending through hinges 36 and 37 to be slightly canted in a vertical inward direction with respect to the vertical hinge axis extending through hinges 33 and 34. This is conventional practice in the mounting of vehicle doors to allow the closure structure to maintain a stable position when either fully closed or fully opened. The lower inner hinge 34 and the lower outer hinge 37 lie in one lateral plane while the upper inner hinge 33 is vertically spaced at a greater distance from the lower inner hinge 34 than the upper outer hinge 36 is from the lower outer hinge 37. The increased vertical displacement of the inner hinges 33 and 34 results in the greater rigidity of the closure structure mounting. The control means 29 is arranged to be relatively flush with the inside of the lower door structure 21 when the closure structure 12 is in a closed position. A stop 39 is mounted on the rearwardly facing surface of the front pillar 32 as best seen in FIGURE 3.

Figure 5:
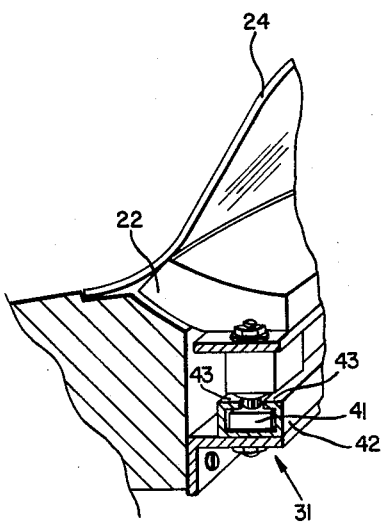
FIGURE 5 is a section taken along line 5—5 of FIGURE 4.

As best seen in FIGURES 4 and 5, guide means 31 for the closure structure 12 comprises a follower head 41 which is directly attached to the inwardly extending end of the cowl forming portion of the sheet metal extension 22. The follower head 41 is slidably retained in the guide rail 42 by two inwardly projecting flanges 43 at its upper end. This guide rail 42 extends from the longitudinal center axis of the vehicle just below the center windshield post 17 in a transverse and slightly upward direction to a point approximately half way between the center windshield post 17 and the front pillar 32.

As can be understood from the description and drawing, the upper glass panel 23 of the closure structure 12 includes the side window 25 and a portion of the wraparound windshield 24 which extend into the roof area of the vehicle. The control means 29 and the guide means 31 cause the closure structure 12 to follow a predetermined movement pattern in which the closure structure 12 moves laterally outwardly and slightly forwardly in a plane substantially coincident with the plane of the body opening 13 initially when the closure structure 12 is manually opened by having an outward pull applied on the door handle 26 by a person seeking entry into the vehicle body 11. As the control member 29 reaches the approximate angular position seen in FIGURE 3, the lower door structure 21 will commence to pivot about a vertical axis extending through the hinges 36 and 37 while counterclockwise movement of the control member 29 continues. This will cause the closure structure 12 to be slightly angularly displaced with respect to its initial plane with the forward portion of the lower door structure 21 swinging inwardly towards the front fender 19 as best seen in FIGURE 3.

The follower head 41, after having been moved laterally outwardly in the guide rail 42, will slightly rotate to accommodate the angular displacement of the closure structure 12. When the control member 29 reaches the position substantially normal to the longitudinal center axis of the vehicle body 11, the maximum opening position of the closure structure 12 is achieved. Further movement of the closure structure 12 is prevented by stop 39 which abuts the outer surface of the control member 29. The guide rail 42 restricts the longitudinal movement of the follower head 41 to prevent further pivotal movement of the lower door structure 21 about the hinges 36 and 37. Thus, when the closure structure 12 has reached its maximum opened position as seen in FIGURE 2, contact of the forward edge of the lower door structure 21 with the front fender 19 is avoided.

It can be seen from the foregoing description that a readily accessible opening 13 to the vehicle body 11 is provided by the laterally outward translation of the sweeping upper glass panel 23 upon the opening movement of the closure structure 12, thereby preventing the inwardly curving portion of the glass panel 23 from interfering with egress from the vehicle. Also, the outer edge of the closure structure 12 in its fully opened position projects out a relatively shorter distance from the vehicle body 11 than automobile doors currently installed in motor vehicles due to the lateral, forward, and angular displacement of the closure structure with respect to the vehicle body opening 13 during its opening movement.

It will be understood that the invention is not to be limited to the exact construction described but that various changes and modifications may be made without departing from the spirit and scope of the invention as defined in the appended claims.

I claim:

1. In a vehicle body having a body opening defined at least in part by a generally vertically extending front pillar and a windshield post; a closure structure for said body opening mounted on said vehicle body for movement between closed and opened positions, said closure structure comprising a lower partial door structure having a cowl forming extension and a transparent glass panel including a side window and windshield forming portion extending upwardly from said cowl forming extension; a control means pivotally connected at one end to said front pillar and at the other end to said inside surface of said lower door structure intermediate its edges; a follower attached to said cowl forming extension; and a guide receiving said follower attached to said vehicle body; said control means and guide coacting with said closure structure to control the latter during movement from its closed position outwardly and forwardly of the vehicle body opening, said lower partial door structure and side window being maintained in a plane substantially coincident with said vehicle body opening during initial phase of opening movement, said closure structure then being angularly displaced with respect to said body opening during further opening movement of said closure structure to its maximum opened position.

2. In a vehicle body having a body opening defined at least in part by a generally vertically extending front pillar and a windshield post; a closure structure for said body opening mounted on said vehicle body for movement between closed and opened positions, said closure structure comprising a lower partial door structure having a cowl forming extension affixed to its upper edge and a transparent glass panel including a generally longitudinally extending side window and a generally transversely extending windshield forming portion extending upwardly from said cowl forming extension; a control means pivotally connected at one end to said front pillar and at the other end to the inside surface of said door structure intermediate its edges; follower means attached to said cowl forming extension; and a guide attached to said vehicle body receiving said follower means; said control means and said guide coacting with said closure structure to control the movement of the latter from its closed position to an intermediate position outwardly and forwardly of said vehicle body opening, said lower partial door structure and said side window being maintained in a plane substantially coincident with said opening during initial phase of opening movement, said closure structure then being angularly displaced with respect to said body opening during further opening movement of said closure structure from its intermediate position to its maximum opened position.

3. In a vehicle body having a body opening defined at least in part by a generally upright windshield post and a generally transversely extending inner cowl structure; a closure structure for said body opening mounted on said body for movement between closed and opened positions, said closure structure comprising a lower half partial door structure having a longitudinally and laterally inwardly extending outer cowl forming extension attached to its upper edge, and a transparent glass panel including a windshield forming portion extending upwardly from said outer cowl forming extension; a hinge assembly pivotally connected at one end to said front door pillar and at the other end to the lower partial door structure intermediate its edges; a follower attached to the transversely inwardly extending end of said cowl forming extension; and a guide extending generally transversely of said vehicle and affixed to said inner cowl structure, said guide slidably receiving said follower; said hinge assembly and said guide coacting with said closure structure to control the movement of said closure structure from its closed position to an intermediate position outwardly and forwardly of said vehicle body opening, said lower half partial door structure being maintained in a plane substantially coincident with the plane of said body opening and said windshield portion being maintained in a plane substantially perpendicular to the plane of said body opening during the initial phase of opening movement, said closure structure then being angularly displaced relative to the initial planes of said lower half door structure and said windshield portion during further opening movement of said closure structure until the latter is at its maximum opened position.

4. In a vehicle body having a body opening defined at least in part by a generally vertically extending front pillar, a generally vertically extending windshield post at the longitudinal center axis of said vehicle, and a generally transversely extending inner cowl member; a closure structure for said body opening mounted on said body for movement between closed and opened positions, said closure structure comprising a lower partial door structure having a generally laterally extending outer cowl forming extension affixed to its upper edge, and a glass panel including a generally longitudinally extending side window integrally formed with one-half of a generally transversely extending windshield extending upwardly from said outer cowl forming extension; a hinge assembly comprising a first hinge means pivotally connecting one end of said hinge assembly to said front pillar and a second hinge means pivotally connecting the other end of said hinge assembly to said lower door structure intermediate its vertical edges; follower means attached to the generally transversely inwardly extending end of said outer cowl forming extension; and guide means slidably receiving said follower means, said guide means extending generally transversely and outwardly from said windshield post and supported by said inner cowl member; said hinge assembly and guide means coacting with said closure structure to control the movement of said closure structure from its closed position to an intermediate position outwardly and forwardly of said body opening, said lower partial door structure and said side window being maintained in a plane substantially coincident with the plane of said body opening and said windshield being maintained in a plane substantially perpendicular to said body opening during the initial phase of opening movement, said closure structure then being angularly displaced relative to the initial planes of said lower door structure and said windshield during further opening movement of said closure structure from its intermediate position until the closure structure is at its maximum opened position.

5. The structure as described in claim 4 and which is further characterized in that said first hinge means comprises two vertically spaced hinges having a common pivotal axis extending in a generally vertical direction, and said second hinge means comprises two vertically spaced hinges having a common pivotal axis that is slightly inwardly canted with respect to the pivotal axis of said first hinge means.

6. In a vehicle body having a body opening defined at least in part by a generally vertically extending front pillar, a generally vertically extending windshield post at the longitudinal center axis of said vehicle, and a generally transversely extending inner cowl member, a closure structure for said body opening mounted on said body for movement between closed and opened positions, said closure structure comprising a lower partial door structure having a laterally extending outer cowl forming extension at its upper edge, and a transparent glass panel including a side window and one-half of the windshield extending upwardly from said outer cowl forming extension, a stop on said front pillar, a control means generally mounted for swinging movement between longitudinal and transverse positions including a pair of inside hinges vertically spaced from each other pivotally connecting one end of said control means to said front pillar and a second pair of hinges vertically spaced from each other pivotally connecting the other end of said control means to said lower door structure intermediate its vertical edges, the vertical spacing of said first pair of hinges being greater than the vertical spacing of said second pair of hinges, the pivotal axis of said second pair of hinges being vertically inwardly canted with respect to the pivotal axis of said first pair of hinges, a follower attached to the generally inwardly transversely extending end of said outer cowl forming extension, and a guide supported by said inner cowl member, said guide extending generally transversely from said windshield post and terminating intermediate said windshield post and said front door pillar, said guide slidably receiving said follower, said control means and said guide coacting with said closure structure to control the movement of said closure structure from its closed position to an intermediate position outwardly and forwardly of said body opening, said lower partial door structure and said side window being maintained in a plane substantially coincident with the plane of said body opening and said one-half of the windshield being maintained in a plane substantially perpendicular to the plane of said body opening during initial phase of opening movement, said lower partial door structure, said side window, and said one-half of the windshield then being angularly displaced relative to their initial planes during further movement of said closure structure from its intermediate position until the closure structure is in contact with said stop upon reaching its maximum opened position.

References Cited in the file of this patent
UNITED STATES PATENTS

| | | |
|---|---|---|
| 2,464,696 | Lelong | Mar. 15, 1949 |
| 2,822,214 | Rivolta | Feb. 4, 1958 |
| 3,006,683 | Smith | Oct. 31, 1961 |